United States Patent Office 2,785,920
Patented Mar. 19, 1957

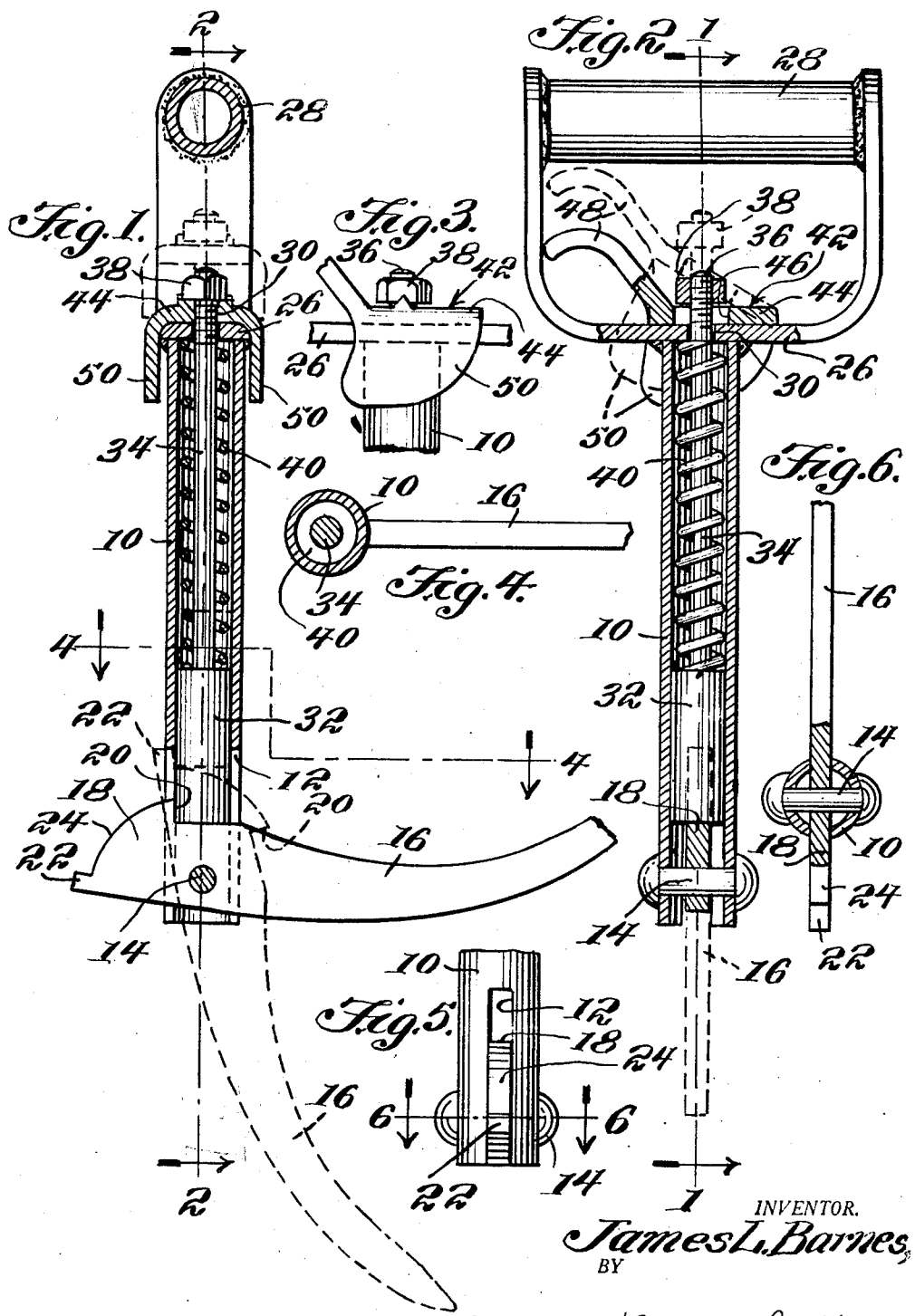

2,785,920

BALE HANDLING HOOK

James L. Barnes, Rochester, Minn.

Application July 30, 1954, Serial No. 446,765

3 Claims. (Cl. 294—26)

This invention relates to a bale handling hook and has for its primary object to provide improved means to facilitate the disengagement of the hook from a bale after the latter has been placed in a selected position.

Another object is to enable the hook to be released by the exertion of pull on a more conveniently arranged trigger.

The above and other objects may be attained by employing this invention which embodies among its features a tubular shank, a prong carried by the shank for movement in an arcuate path adjacent one end thereof from an operative position in which it extends laterally outwardly from the shank for engagement with and for holding a bale, to an inoperative position in which it extends substantially longitudinally from the shank for extraction from the bale, a latch carried by the shank for movement longitudinally therein into engagement with the prong to hold said prong in its operative position, a D-handle carried by the shank and extending across the end thereof remote from the prong, a lift lever carried by the D-handle for rocking movement across the end of the shank adjacent the handle, a trigger carried by the lift lever and extending upwardly and outwardly therefrom adjacent one end thereof for engagement by a finger of a hand holding the handle, and a link carried by the latch and extending through the lift lever for movement thereby and disengagement of the latch from the prong.

Other features include spaced guide ears carried by the lift lever and extending perpendicularly therefrom adjacent opposite sides of the shank to guide the lift lever during its rocking movement.

In the drawings:

Figure 1 is a longitudinal sectional view through a bale handling hook embodying the features of this invention;

Figure 2 is a side view partially in section of the bale handling hook illustrated in Figure 1;

Figure 3 is a fragmentary side view of the bale handling hook;

Figure 4 is a horizontal sectional view taken substantially on the line 4—4 of Figure 1;

Figure 5 is a fragmentary side view of a portion of the tubular shank showing the location of the prong in relation thereto; and Figure 6 is a fragmentary horizontal sectional view taken substantially on the line 6—6 of Figure 5.

Referring to the drawings in detail, the illustrated device comprises a tubular shank 10 provided in one end with diametrically opposed slots 12. Extending across the tubular body 10 adjacent the slotted end thereof is a pivot pin 14 on which is pivoted at a point near one end, a bale engaging prong 16. On the said one end of the prong 16 and located at the side of the shank 10 remote from the main portion of the prong is a sector 18 having a shoulder 20 adjacent one end thereof. Extending outwardly from the sector adjacent the opposite end thereof is a stop lug 22 which, when the prong extends substantially longitudinally of the shank 10, engages a latch which is mounted within the shank 10 to arrest downward movement of the prong. The convex surface 24 of the sector which extends between the shoulder 20 and stop lug 22 defines a surface which is engaged by the latch, to be more fully hereinafter described.

Carried by the tubular shank 10 adjacent the end thereof remote from the prong 16 is a D-handle 26 which extends transversely across the end of the tubular body 10 and carries a hand grip 28. The handle 26 is provided with an opening 30 which aligns axially with the shank 10, as will be readily understood upon reference to the drawings.

Mounted for sliding movement within the shank 10 adjacent the slots 12 is a latch plunger 32 which, as illustrated in Figure 1, is adapted to ride upon the arcuate surface 24 of the sector 18 during the movement of the prong 16 from the full line position illustrated in Figure 1 to the broken line position illustrated therein. Fixed on the latch plunger 32 and extending upwardly therefrom through the opening 30 in the handle 26 is a rod 34 carrying adjacent its upper end external screw threads 36 onto which is threadedly engaged a stop nut 38. Surrounding the rod 34 and bearing at one end on the latch plunger 32 and bearing at its opposite end on the handle 26 is a compression coil spring 40 which, as illustrated in the drawings, tends to urge the latch plunger 32 into engagement with the sector 18 or with another portion of the prong 16.

A lift lever designated generally 42 is carried by the handle 26 and comprises a plate 44 having an elongated slot 46 passing the shank 34 immediately beneath the stop nut 38. A trigger arm 48 is fixed on the plate 44 and extends outwardly and upwardly therefrom for engagement by a finger of a hand gripping the grip 28 for exerting pull on the plate 44 to rock it upwardly, as suggested by the broken lines in Figure 2, and thereby exert pull on the rod 34 so as to elevate the latch 32 against the resistance of the spring 40 and thereby release the prong 16 for movement from the full line position substantially as illustrated in Figure 1 to the broken line position substantially as illustrated in Figure 1. Carried by and extending downwardly from opposite sides of the plate 44 are spaced parallel guide ears 50 which straddle the portion of the handle 26 engaged by the tubular shank 10 to serve as guide means for the plate 44 as it is tilted, as suggested by the broken lines in Figure 2.

Obviously, when the hook is to be used by a left handed person the nut 38 may be disengaged from the rod 34 to enable the lift lever 42 to be removed from the rod 34 and turned around so that the trigger arm 48 may extend to the right as viewed in Figure 2, after which the nut 38 may again be threadedly engaged with the rod 34.

In use, it will be evident that the prong 16 is held in the operative position illustrated in full lines in Figure 1 by the engagement of the latch plunger 32 with the shoulder 20. When it is desired to extract the prong 16 from a bale, pull is exerted on the trigger arm 48 to cause the plate 44 to rock to the position substantially as illustrated in broken lines in Figure 2, and thereby pull the rod 34 upwardly so as to move the latch 32 out of engagement with the shoulder 20 so as to permit the prong 16 to move about the pivot 14 into the broken line position illustrated in Figure 1. With the prong in this position, it may be easily extracted from the bale even though the bale may be located in close quarters either between other bales or between a wall and another bale.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a bale handling hook, a tubular shank having an open forward end provided with a longitudinal slot opening through said forward end and through the opposite sides of the shank, a pivot pin fixed in and extending across the shank and crosswise of said slot, a prong having a forward entering end and a rear end and being engaged in said slot and pivoted intermediate its ends on said pivot pin, said prong having first and second longitudinal edges, a sector on said rear end of the prong, said sector being wider than said rear end and having a portion projecting laterally beyond said one edge of the prong and with said one edge defining a shoulder, said sector having a convex surface extending thereacross from said shoulder toward said second edge of the prong, a stop lug on said sector at the said second edge of the prong and projecting outwardly beyond said convex surface at the end thereof remote from said shoulder, said stop lug being arranged to engage said shank only in an operative position of said prong in which the prong extends longitudinally from the forward end of the shank, a forwardly spring pressed plunger slidably confined in said shank and having a forward end engaging the said first edge of the prong and said shoulder in the inoperative position of the prong in which the prong extends crosswise of the shank, and means on said shank connected with the plunger for retracting the plunger rearwardly in the shank to permit said prong to be pivoted away from its inoperative position to its operative position wherein the forward end of the plunger engages said convex surface and said stop lug engages a side of the shank.

2. In a bale handling hook, a tubular shank having an open forward end provided with a longitudinal slot opening through said forward end and through the opposite sides of the shank, a pivot pin fixed in and extending across the shank and crosswise of said slot, a prong having a forward entering end and a rear end and being engaged in said slot and pivoted intermediate its ends on said pivot pin, said prong having first and second longitudinal edges, a sector on said rear end of the prong, said sector being wider than said rear end and having a portion projecting laterally beyond said one edge of the prong and with said one edge defining a shoulder, said sector having a convex surface extending thereacross from said shoulder toward said second edge of the prong, a stop lug on said sector at the said second edge of the prong and projecting outwardly beyond said convex surface at the end thereof remote from said shoulder, said stop lug being arranged to engage said shank only in an operative position of said prong in which the prong extends longitudinally from the forward end of the shank, a forwardly spring pressed plunger slidably confined in said shank and having a forward end engaging the said first edge of the prong and said shoulder in the inoperative position of the prong in which the prong extends crosswise of the shank, and means on said shank connected with the plunger for retracting the plunger rearwardly in the shank to permit said prong to be pivoted away from its inoperative position to its operative position wherein the forward end of the plunger engages said convex surface and said stop lug engages a side of the shank, a handle fixed on the rear end of the shank and having a member extending crosswise of the shank, said latch plunger comprising a reduced diameter rod on said plunger traversing the rear end of the shank and said handle member, a trigger plate having opening means intermediate its ends through which said rod freely extends, stop means on the rod rearwardly of the trigger plate, said trigger plate having a first end rockably bearing on said handle member at one side of the rod and a second end located at the opposite side of the rod, and a trigger arm fixed on said second end of the trigger plate and projecting therefrom in the region of said handle.

3. In a bale handling hook, a tubular shank having an open forward end provided with a longitudinal slot opening through said forward end and through the opposite sides of the shank, a pivot pin fixed in and extending across the shank and crosswise of said slot, a prong having a forward entering end and a rear end and being engaged in said slot and pivoted intermediate its ends on said pivot pin, said prong having first and second longitudinal edges, a sector on said rear end of the prong, said sector being wider than said rear end and having a portion projecting laterally beyond said one edge of the prong and with said one edge defining a shoulder, said sector having a convex surface extending thereacross from said shoulder toward said second edge of the prong, a stop lug on said sector at the said second edge of the prong and projecting outwardly beyond said convex surface at the end thereof remote from said shoulder, said stop lug being arranged to engage said shank only in an operative position of said prong in which the prong extends longitudinally from the forward end of the shank, a forwardly spring pressed plunger slidably confined in said shank and having a forward end engaging the said first edge of the prong and said shoulder in the inoperative position of the prong in which the prong extends crosswise of the shank, and means on said shank connected with the plunger for retracting the plunger rearwardly in the shank to permit said prong to be pivoted away from its inoperative position to its operative position wherein the forward end of the plunger engages said convex surface and said stop lug engages a side of the shank, a handle fixed on the rear end of the shank and having a member extending crosswise of the shank, said latch plunger comprising a reduced diameter rod on said plunger traversing the rear end of the shank and said handle member, a trigger plate having opening means intermediate its ends through which said rod freely extends, stop means on the rod rearwardly of the trigger plate, said trigger plate having a first end rockably bearing on said handle member at one side of the rod and a second end located at the opposite side of the rod, and a trigger arm fixed on said second end of the trigger plate and projecting therefrom in the region of said handle, said plunger further comprising a helical spring circumposed on said rod and compressed between said plunger and said cross member of the handle.

References Cited in the file of this patent
UNITED STATES PATENTS

| 2,584,715 | Kmiecik | Feb. 5, 1952 |
| 2,631,882 | Satre | Mar. 17, 1953 |